United States Patent [19]

Schatz

[11] Patent Number: 4,759,188
[45] Date of Patent: Jul. 26, 1988

[54] METHOD FOR INTRODUCTION OF CHARGING AIR INTO THE CYLINDER OF AN INTERNAL COMBUSTION ENGINE AND AN ENGINE FOR UNDERTAKING THE METHOD

[76] Inventor: Oskar Schatz, Waldpromenade 16, D-8035 Gauting, Fed. Rep. of Germany

[21] Appl. No.: 8,153

[22] Filed: Jan. 22, 1987

Related U.S. Application Data

[63] Continuation of Ser. No. 700,768, filed as PCT DE84/00111 on May 18, 1984, published as WO84/04564 on Nov. 22, 1984, abandoned.

[30] Foreign Application Priority Data

| May 18, 1983 | [DE] | Fed. Rep. of Germany | 3318161 |
| May 18, 1983 | [DE] | Fed. Rep. of Germany | 3318094 |
| May 18, 1983 | [DE] | Fed. Rep. of Germany | 3318136 |

[51] Int. Cl.$^4$ .............................................. F02B 37/00
[52] U.S. Cl. .................................... 60/605.1; 123/560
[58] Field of Search ..................... 60/605, 611, 624; 123/559, 560, 564

[56] References Cited

U.S. PATENT DOCUMENTS

| 2,102,946 | 12/1937 | Dugelay | 123/560 |
| 2,391,163 | 12/1945 | Jessup . | |
| 2,670,595 | 3/1954 | Miller | 60/611 X |
| 4,211,082 | 7/1980 | Bristol | 60/605 |

FOREIGN PATENT DOCUMENTS

| 413171 | 2/1936 | Belgium . | |
| 437926 | 3/1912 | France . | |
| 781987 | 3/1935 | France | 60/605 |
| 225527 | 7/1925 | United Kingdom . | |
| 638923 | 6/1950 | United Kingdom . | |
| 815494 | 6/1959 | United Kingdom . | |

Primary Examiner—Michael Koczo
Attorney, Agent, or Firm—Harness, Dickey & Pierce

[57] ABSTRACT

A method for the introduction of the charging air into the cylinder of an internal combustion engine, in the case of which pre-compressed air from a displacement charger is cooled by exchange of heat and is then expanded till the desired charging pressure has been reached. The expulsion motion of the piston or pistons of the displacement charger is so synchronized with the piston motion of the engine cylinder to be supplied that the air displaced from the charger transfers directly into the respective engine cylinder.

4 Claims, 5 Drawing Sheets

METHOD FOR INTRODUCTION OF CHARGING AIR INTO THE CYLINDER OF AN INTERNAL COMBUSTION ENGINE AND AN ENGINE FOR UNDERTAKING THE METHOD

This is a continuation of United States patent application Ser. No. 700,768, filed as PCT DE84/00111 on May 18, 1984, published as WO84/04564 on Nov. 22, 1984 entitled Method for introduction of charging air into the cylinder of an IC engine and an engine for undertaking the method, now abandoned.

The invention relates to a method for the introduction of the charging air into the cylinder of an internal combustion engine, in the case of which pre-compressed air from a displacement charger is cooled by the exchange of heat and is then expanded till the desired charging pressure has been reached, and to an engine for undertaking the method.

Comparable methods have been proposed in the past, as for example the "turbo-cooling" or "Miller" method. However mass production of engines designed to use such methods has not been possible because of excessively high costs and a high energy requirement for driving the charger. More specifically, the heavy driving power requirement were such as to partly outbalance the beneficial effects of the method such as a decrease in fuel consumption. Furthermore, the potential reduction in the NOX values and the potential improvement in knock resistance of gasoline engines were not fully taken advantage of.

The aim of the invention is to reduce the fuel consumption of an engine, more particularly by cutting down the power needed for driving the charger, to increase the power-to-weight ratio of an engine and to keep the temperature of the charging air at the lowest possible level.

In keeping with the invention this aim is achieved by so synchronizing the expulsion motion of the piston or pistons of the displacement charger with the piston motion of the engine cylinder to be supplied that the air displaced from the charger transfers directly into the respective engine cylinder.

This method makes it unnecessary to expend work on expulsion into an intermediate storage means, as is the case with so-called supercharging.

In keeping with one working example of the method of the invention, the expansion make take place in the engine cylinder.

The synchronization between the engine motion and the motion of the charger may be set permanently at the outset, viz. so that it may not be modified. In this form of the invention, as part of a convenient development, in the case of an exhaust driven displacement charger, the rhythm of the charging air waves may be controlled by the rhythm of the natural exhaust gas pulses.

In keeping with a convenient form of the invention, the degree of expansion may be effected by premature closing of the inlet valve of the engine cylinder. The timing of such valve closure may be set as a fixed value or there may be means for adjusting it.

The timing of the start of expansion of the charging air in the engine cylinder may furthermore be brought about as well by modifying the phase relation between the motion of the engine piston and of the charger piston. By modifying such phase relationship the air rate may be changed. The air rate may furthermore be controlled in other ways additionally.

In accordance with an advantageous form of the invention, a part of the charging air is taken in by the motion of the engine piston. As a result the structure of the system becomes less involved and the power needed to drive the charger less.

The modification of the phase relation between the motion of the engine piston and of the charger piston may be effected by adjustable control on the exhaust side of the charger in the case of an exhaust driven displacement charger. In mechanically driven chargers the modification of the phase relation between the motion of the engine piston and of the charger piston may be effected by using a belt drive, in which the input shaft is able to be turned in relation to the output shaft for adjustment.

In the case of an exhaust drive charger, the intensity of the natural exhaust pulses may be enhanced by additional means on the exhaust side of the chargers, as for example a choke.

The rate control in the case of an exhaust driven charger may be effected by a suitably designed return spring acting on the freely moving charger piston so that the piston stroke may be changed in keeping with the intensity of the exhaust pulses.

The beginning of expansion of the charging air in the engine cylinder may be controlled to coincide with the end of the stroke of the charger piston. In this case, if there is no check valve at the air outlet of the charger, it is possible to have a return or reverse expansion of the compressed charging air out of the engine cylinder into the charger till the inlet valve of the engine shuts. Such a design keeps down costs and is not without a favorable effect on the flow rate of the charging air through the heat exchanger positioned between the charger and the engine.

The air aspirated in addition to the suction motion of the charger may make its way via a bypass around the charger into the engine cylinder or directly through a suitably designed charger.

According to a beneficial further development of the method for separately controlling the air rate and the start of expansion, it is possible to correspondingly change the volumetric displacement of the charger and the dead space in the charger, the air duct, the heat exchanger and the engine.

Instead of causing expansion to take place in the engine cylinder, it is possible as part of a further convenient development of the invention, to let such expansion take place between the heat exchanger and the engine cylinder. In this respect, the energy of expansion may be supplied via an expander to the engine output shaft. The expander may be combined with the charger in order to make good use of the energy of expansion for pre-compression of the charging air. Furthermore it may be as well to use a combination of a charger, a charging air expander and a device for the expansion of the exhaust gas.

Further useful developments of the invention will be seen from the dependent claims in conjunction with the description of the figures. The invention will now be explained in more detail on the basis of the following account of the working examples of the invention to be seen in the figures.

FIG. 1 is a diagrammatic view of a four stroke engine, two cylinders of which are connected with a displacement charger for undertaking the method of the invention.

FIG. 2 diagrammatically shows an engine cylinder with a displacement charger with disk-like pistons.

Figure 4:
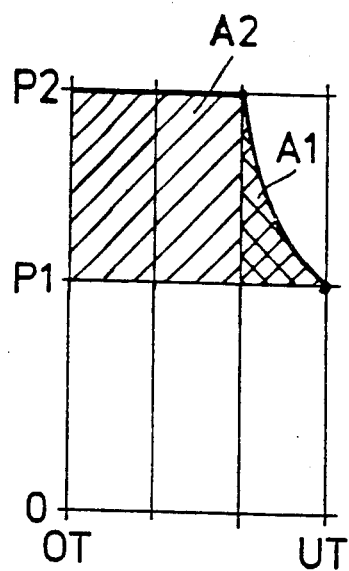
FIG. 4 is a cycle diagram of the charger during conventional charging.
Figure 5:
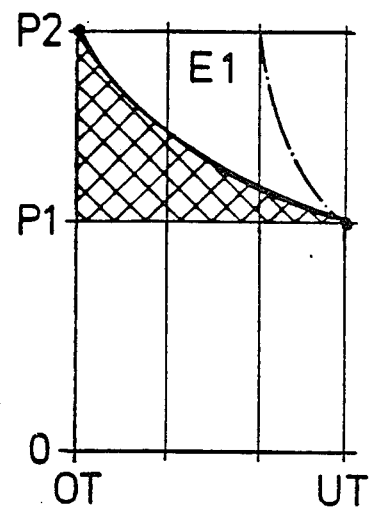
FIG. 5 is a cycle diagram of the charger for use in a first possible form of the method of the invention.
Figure 6:
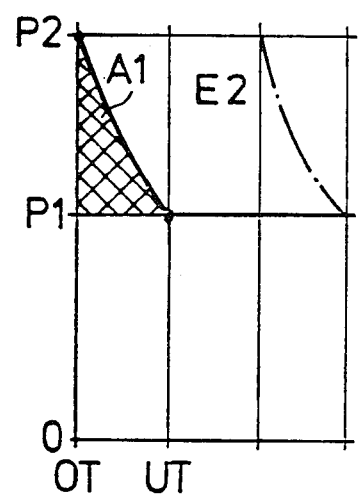
FIG. 6 is a cycle diagram of the charger of a second possible form of the invention.

For the sake of facilitating an understanding an account of the workings of the invention will first be presented by way of comparison with known charging methods using FIGS. 4 to 6. In these diagrams variations in the volume of the charging chamber are marked along the horizontal axis, the air requirement in all examples being 1.5 liters and the volume of the combustion space to be charged being assumed to be 1 liter, this resulting in the desired compression ratio of 1.5 to 1. Dead space in the system is neglected. The pressures are measured along the vertical axis, the pressure P1 being the atmospheric pressure and the pressure P2 being the charging pressure in the engine cylinder. On the horizontal axis UT denotes ldc or lower dead center, i.e. the position of the displacement charger, at which the charging chamber has the greatest volume within its working cycle, and OT denotes udc or upper dead center, i.e. the position of the displacement charger, in which the charging chamber has the smallest volume within its working cycle.

The cycle diagram given in FIG. 4 shows the changes in positions and pressures in the displacement charger during conventional charging operation. In this case the charging air is firstly compressed from the atmospheric pressure P1 to the final charging pressure P2 and the it is expelled from the displacement charger into an intermediate storage means (air manifold), from whence the compressed air then flows off into an engine cylinder. In the diagram of changes in pressure it is assumed that the storage means has an infinite volume so that after the compression the pressure remains constant at P2.

In FIG. 4 there is no direct time relation between the compression stroke of the charger and the intake stroke of the engine piston, because a certain air volume may get to the charging pressure any time prior to flowing into the engine cylinder. It will be seen that there is a relatively small part A1 of the work to be performed—representing the compression work—and a very much larger work fraction A2, that represents the work needed for expulsion of the compressed air out of the charger into the buffer, that is formed by the intermediate storage means or the air distribution or manifold means and normally will have a capacity of several stroke volumes of an engine cylinder or of a charger cylinder. In the case of a charging operation as in FIG. 4 the compressed air flows right from the start of the intake stroke, i.e. after the opening of the inlet valve, into the engine cylinder, a part of the expulsion work denoted as A2 being transferred to the engine piston.

In the case of the charging operation in accordance with FIG. 4, no synchronization between the motion of the displacement charger and the motion of the piston of the engine cylinder to be supplied is necessary or provided for. The advantages of the invention stem from a form of synchronizsation that is so contrived that the air displaced form the charger transfers to the engine cylinder taking into account unavoidable dead space. FIGS. 5 and 6 show two possible forms of this way of working.

In the method to be seen in FIG. 5 the expulsion and compression strokes of the displacement charger take place generally during the full duration of the intake stroke of the engine piston. The charging air is sucked in by the piston motion in the engine cylinder and concurrently the air is expelled from the displacement charger and because of the greater stroke displacement of the charger is at the same time compressed from atmospheric pressure P1 to the final pressure P2 before expansion, for which reason this method is referred to as "concurrent charging".

In such concurrent charging the volume of air pumped by the displacement charger is as in conventional charging (FIG. 4) as regards size, with the difference however that the final pressure P2 is only reached at the end of the compression stroke of the displacement charger, that is to say at udc, this coinciding with the end of inlet into the engine cylinder in question. As will furthermore be seen on making a comparison between FIGS. 4 and 5, the amount of work is very much less. The work fraction that is saved is denoted as E1.

FIG. 6 shows a method that is a still further improvement, in which the air is also transferred directly from the displacement charger into the engine cylinder and in which the amount of energy needed is reduced even farther. In this method intake by the engine cylinder is initially under atmospheric pressure without, for the moment, air from the displacement charger being compressed and expelled. It is only later when the piston in the engine cylinder is at the desired point of expansion (start of expansion) that the differential volume is moved directly into the engine cylinder by the displacement charger in order to bring the intake air, still under atmospheric pressure, up to the desired final pressure. In this case the compression of the differential volume desired for a certain engine cylinder is exactly timed having regard to the piston motion in the engine cylinder and thereby directly forced into the combustion space from the compression charger, for which reason this method of charging is, in what follows, referred to as the "direct post-charging" method.

As may be seen from a comparison of FIGS. 4 and 6, during the compression stroke in direct post charging the compression work denoted A1 in FIG. 4 is performed, such work raising the pressure in the engine cylinder to the final pressure before expansion. The fraction of work in conventional charging which is now not needed is denoted as E2 and in its amount is the same as the expulsion work denoted as A2 in FIG. 4. In this method of operation the amounts of driving power needed for the charging device are equal—as may be proved in accordance with the theory—to about 18% of the drive power needed in a case in which the charging air is firstly compressed as in FIG. 4 and expelled into a buffer and then transferred into the engine cylinder.

Figure 1:
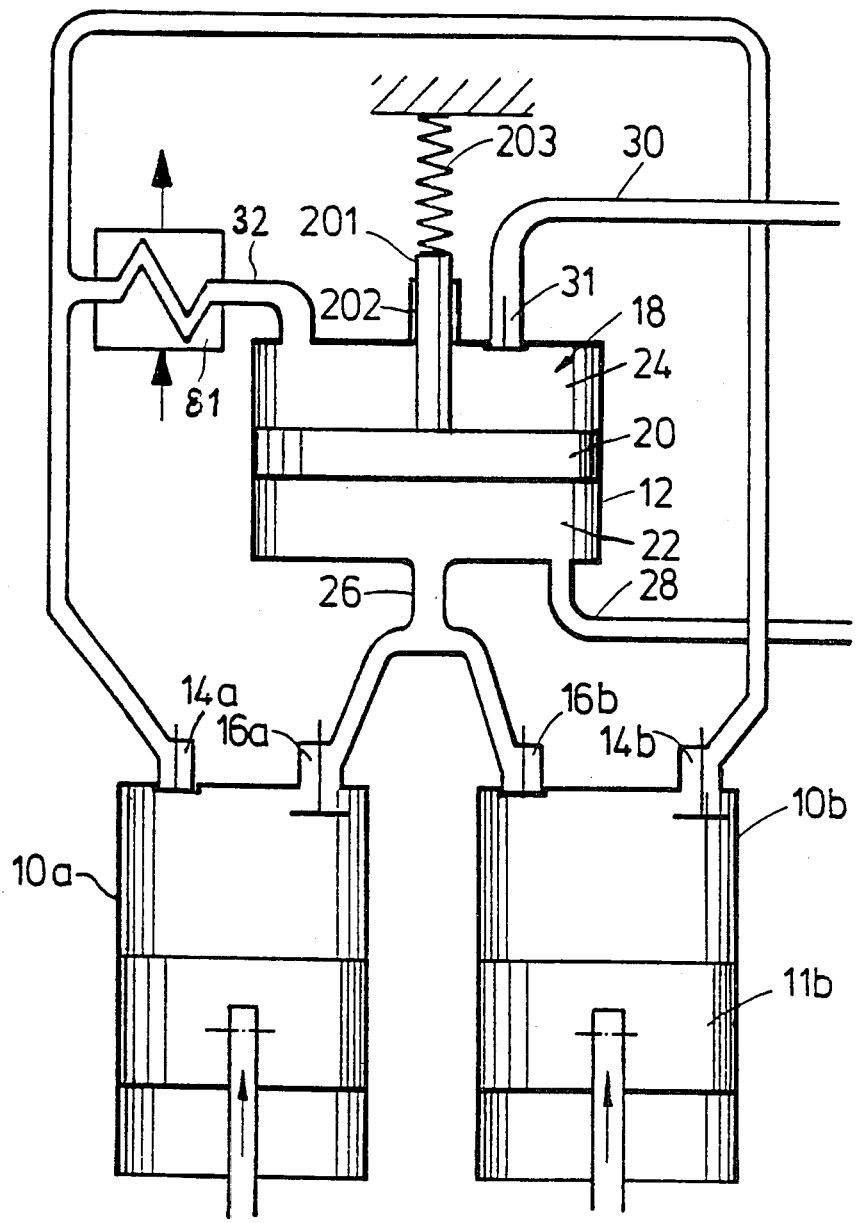

FIG. 1 diagrammatically shows a four stroke engine, that has two cylinders 10a and 10b. Each of these cylinders has an air inlet 14a and 14b respectively and an exhaust outlet 16a and 16b respectively. Between the two cylinders 10a and 10b there is an exhaust charger 12, in which a charging chamber 18 is divided by a partition 20 in the form of a piston into an exhaust chamber 22 and a charging air chamber 24. The exhaust chamber has an exhaust inlet 26 and an exhaust outlet 28, the exhaust inlet 26 being joined with the exhaust outlet 16a of the cylinder 10a and with the exhaust outlet 16b of the cylinder 10b, whereas the exhaust gas outlet 28 of the exhaust chamber 22 is joined with the exhaust system of the engine. The charging air chamber 24 has a charging air inlet 30, in which there is a check valve 31, and a charging air outlet 32, that is joined with the air inlet 14a of the cylinder 10a and with the air inlet 14b of the cylinder 10b. In the event of return flow of the compressed charging air out of the engine cylinder into the charging air chamber 24 not being desired, it is possible for the charging air outlet 32 to be fitted with a check valve. The charging air outlet 32 opens into a heat exchanger 81 to cool the compressed and heated charging air. From this point the air then flows to the charging air inlets 14a and 14b.

The partition 20 is mounted on a guide rod 201 for guided motion in the guide 202. The return spring 203 presses on the guide rod 201 and so opposes the pressure of the exhaust. This is to make certain that the partition 20 is a ldc in the charging air chamber 24 every time the exhaust pulse arrives. The spring 203 may be so designed that the length of stroke of the partition 20 always corresponds to the intensity of the exhaust pulse, this making possible a matching of the amount pumped by way of the charging air chamber 24 to the load of the engine.

For the "concurrent charging" method the volumetric displacement of the charger 12 is so large that it just meets the maximum air requirement of the cylinder 10a or 10b for one cycle of cylinder strokes.

For example by motion of the piston 11b in the cylinder 10b from 1 dc to udc with the air inlet 14b opened air is drawn in through the air inlet 30 of the charger 12. By suitable adjustment of the system, at the start of the intake stroke of the piston 11b, viz. on opening of the air inlet 14b of the cylinder 10b, the partition 20 is reached by a pressure pulse from the exhaust outlet 16a of the cylinder 10a and it is pushed upwards in terms of FIG. 1 so that the air inlet 30 is at once closed by the check valve 31 therefor and all the air requirement of the cylinder 10b is met from the charging air chamber 24 of the charger 12, the motion of the partition 20 increasing the pressure of the charging air till the end of the operation to a value P2, as marked in FIG. 5. The back pressure build-up lastly moves the partition 20 back again with the assistance of the return spring 203 so that the exhaust from the exhaust chamber 22 is expelled via the exhaust outlet 28 into the exhaust system. At the same time air is again drawn in via the charging air inlet 30 into the charging air chamber 24, the check valve 31 therefor then opening.

In the case of "direct post-charging" the exhaust pulse from the exhaust outlet 16a of the cylinder 10a is so timed that it only reaches the partition 20 when the piston 11b is at the desired expansion point. Therefore the piston 11b goes on drawing in charging air under atmospheric pressure P1 till this point in time by way of the charging air inlet 30, the charging air chamber 24 and the charging air outlet 32. When finally the partition 20 moves upwards (FIG. 1), the check valve shuts off the charging air inlet 30 and the pressure in the cylinder 10b will go up from the value P1 to the pressure P2, something that takes place during a displacement of the piston 11b corresponding to a relatively small crank angle, as will be seen from FIG. 6.

Figure 2:
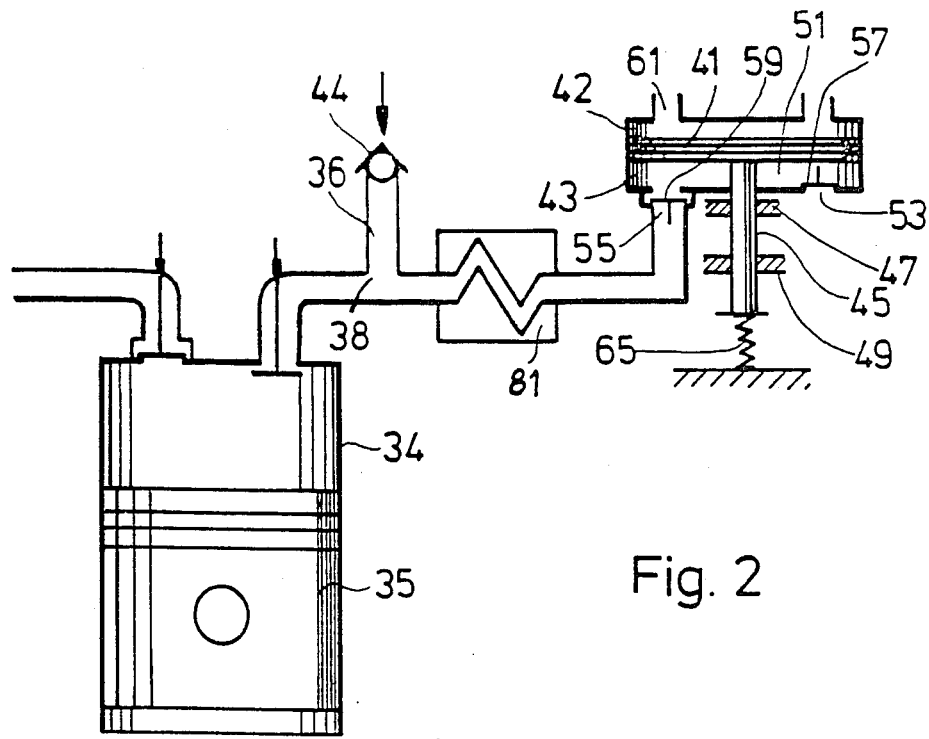

In the form of the invention to be seen in FIG. 2 only one engine cylinder 34 is shown that corresponds to the cylinder 10b of FIG. 1. This cylinder 34 contains a piston 35, that is joined with the crankshaft 39 of the engine by way of a connecting rod 37. In this form of the invention the exhaust charger 42 is joined up by way of a branch duct 38 to the intake duct 36, that upstream from the connection point of such duct 38 is fitted with a check valve 44 so that it is possible for direct intake to take place bypassing the charger 42. The heat exchanger 81 is best placed between the charger 42 and the branch duct 38 so the air heated by the compression in the charger flows through the heat exchanger.

The displacement charger 42 is designed in the form of a short-stroke flat piston charger, whose piston 41 serving as a partition has a piston rod 45 running out of the housing 43 of the charger 42. Outside the housing 43 the piston rod 45 is guided by guides 47 and 49 in the direction of piston motion. The amount of play of the guides and the length of the guiding action are so matched that the piston runs in the housing 43 without making contact with its wall apart from engagement by way of any seal on the piston. The result is then a very compact and cheap construction with a high efficiency. The air charging chamber 51 of the charger 42 has one check valve 57 to 59 at the air inlet 53 and at the air outlet 55, it however being possible to dispense with the check valve 59 at the air outlet 55 if desired. The design of FIG. 2 may as well be used to "concurrent charging" or for "direct postcharging". In concurrent charging the pressure of the exhaust flowing in via the exhaust inlet 61 to an exhaust chamber 63 of the charger 42 forces the piston or the partition 41 downwards in terms of FIG. 2, while the engine piston 35 is performing its intake stroke. In the case of direct post charging an exhaust pulse only comes into being when the engine piston 35 is in the vicinity of the desired expansion point. After the charging stroke of the charger 42, the partition 41 is moved back by a compression spring 65 acting of the piston rod 45 into the upper end position to be seen in FIG. 2.

In the case of many engines the amount of space available and/or the order of operation of valve motion in time do not make it possible to use the manner of operation as described above, i.e. to use the exhaust wave coming out through the exhaust valve of one cylinder directly for pushing or propelling the charging air into another cylinder. In such a case its is then best to have an exhaust buffer or storage means between the exhaust outlet of the engine cylinder and the charging chamber, it however then being necessary for the phased supply of the charging chamber with exhaust to be controlled, viz. the charging chamber is then supplied with amounts of exhaust from the exhaust buffer in each case in accordance with the stroke rate and the energy requirement of the compressor. In this case as well it is possible to have a direct or other synchronization of the compressor stroke of one charging chamber with the intake stroke of the corresponding engine cylinder.

If synchronization of the motion of the engine and charging pistons is to be provided for, it is possible to have a means controlling the exhaust pulses in the case of the exhaust charger.

Dependent on specific requirements, it is possible for the exhaust side of the charging chamber 18 to be fitted with an inlet and/or and outlet valve. The control on the exhaust side of the charging chamber 18 may furthermore be electronic, in which case the man in the art will be able to take advantage of known means for electronic input of operational data of the engine, of the charger and of other instrumentalities in order to optimize operation of the charger, such factors including antiknock control in the case of gasoline engines or control of NOX values, so that it is not necessary to go into such matters in any more detail here. This optimization means may furthermore be so contrived that the back pressure caused by the charging means in the exhaust gas is optimized. The electronic automatic control system may with advantage be made to affect the efficiency and the behavior of the driving system and furthermore the costs.

Dependent on the design of the engine and more specially on its maximum speed, it may be advantageous to combine a charger with a number of pairs of cylinders of a four stroke engine or with a number of cylinders of a two stroke engine. It is more specially in the case of multi-cylinder engines that the exhaust from a number of engine cylinders will be passed into a common exhaust manifold, that then serves simultaneously as a pressure balancing container and a buffer. In this respect it may be economically better to supply a number of charging chambers 18 of a large engine from a single exhaust manifold or collector. It is however more specially advantageous to be able to so use the above described beneficial manner of operation of direct or individual concurrent or post charging of the separate engine cylinders in engines of any desired design and with any number of cylinders.

For the described method of "concurrent charging" and of the "direct post-charging" a synchronization between the motion of the engine pistons and the motion of the charger is important. This however does as well open up a way to regulate the rate by changing the phase relation between the motion of the engine and the motion of the charger. This is more specially advantageous for the rate regulation of a mechanically driven charger, as is to be seen for example in FIG. 3, because this makes it possible to dispense with rate regulation, that is very involved in the case of mechanical chargers, by varying the stroke, controlling the speed of rotation or by blowing off compressed air.

Figure 3:
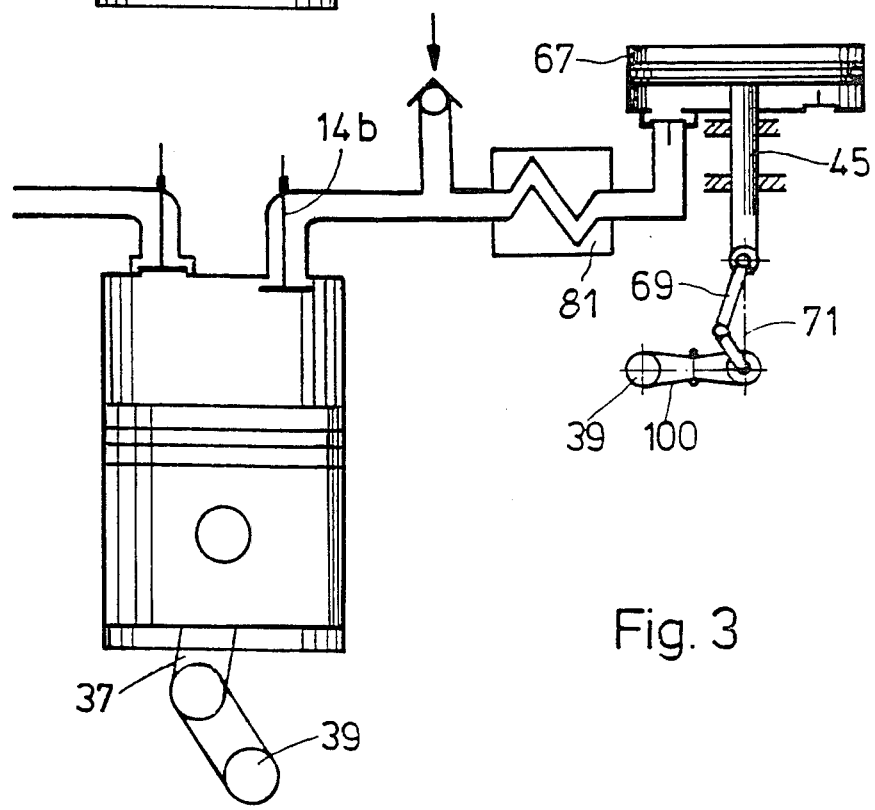
FIG. 3 is a view similar to that of FIG. 2 of an engine, that is fitted with a displacement charger as driven from the engine crankshaft.

The charger 67 shown in FIG. 3 differs from the charger 42 driven by exhaust as in FIG. 2 inasfar as there is no exhaust chamber 63 and the piston rod 45 is joined by way of a connecting rod 69 with a crank 71, that for its part is able to be driven by way of a belt drive, generally referenced 100, from the engine crankshaft 39, the belt dirve 100 comprising a device to vary the phase relation between the engine crankshaft 39 and the crank 71 used to drive the charger 67. This device will be described in more detail later using FIGS. 8 and 9.

The full charge is reached in the engine cylinder 34 (FIG. 2) in the case of "direct post-charging" when the udc of the charger 67 is timed to exactly coincide with the desired expansion point of the engine cylinder 34.

If the charger 67 shown in FIG. 3 is designed with an upper end wall having an air inlet and an air outlet, the air inlet and possibly the air outlet being fitted with its own check valve, then the outcome is a simple way of producing a second air charging chamber. It is then best for each of these air charging chambers to be connected with one respective half of the air inlets of the engine. In this way the mutual interference between charging air pulses, which becomes more pronounced with a large number of cylinders, may be conveniently reduced.

Figure 7:
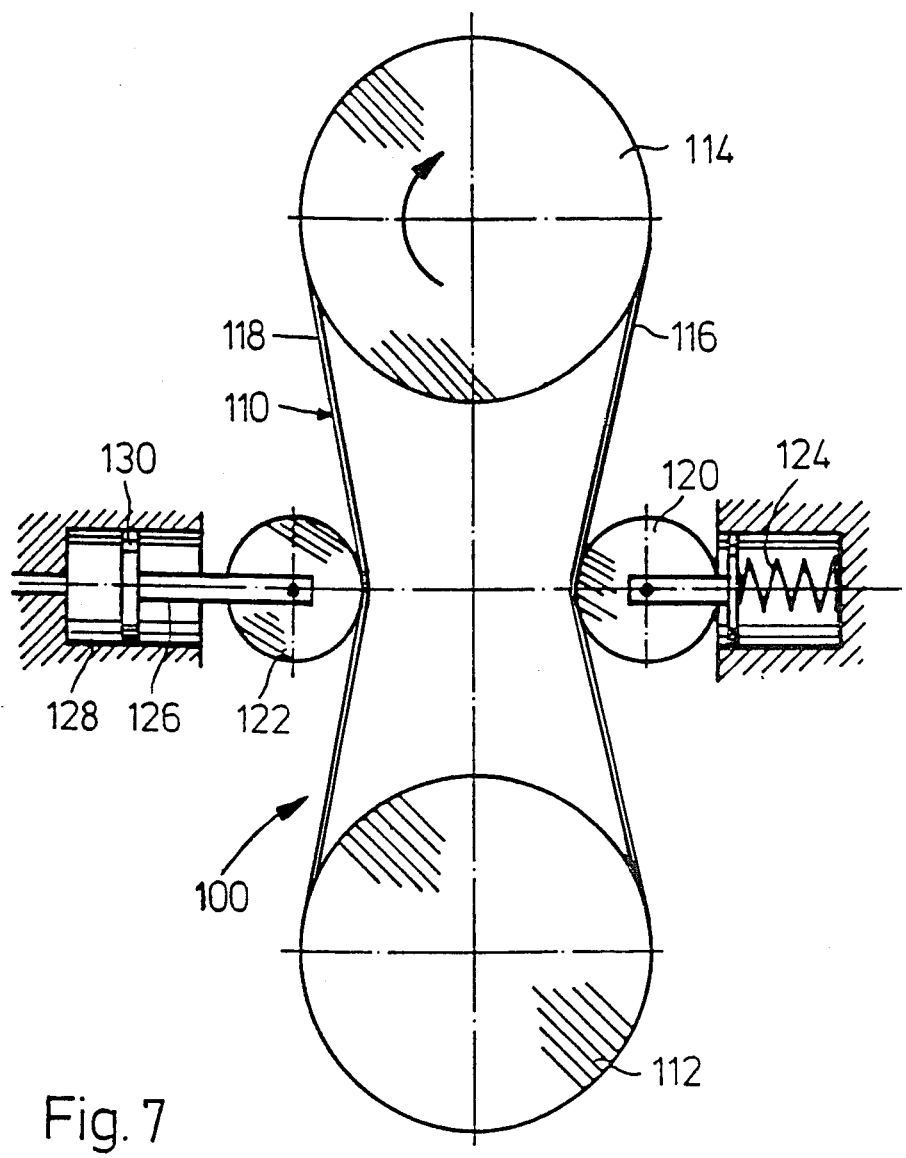
FIG. 7 is a diagrammatic side elevation of a first form of a belt drive which may be used in the system of FIG. 3.

The belt drive 100 to be seen in FIG. 7 comprises a belt 110, that is best in the form of a toothed belt, running over four pulleys in all, namely a driving pulley 114, an output pulley 112 and, between the output pulley 112 and the drive pulley 114 as seen in the direction of belt motion, a pulley 120 that is able to be adjusted in position in a direction normal to the direction of motion of the belt. Furthermore there is a pulley 122 that is placed between the drive pulley 114 and the output pulley 112 and may be adjusted in position in a direction normal to the direction of belt travel. For this reason the pulley 120 engages the return run 116 of the belt and the pulley 122 runs on the driving run 118 of the belt 110. This arrangement is convenient inasfar as the pulley 120 is pressed by a spring 124 against the belt 110 in order to keep up the desired belt tension. Because it is possible for the pulley 120 to be moved somewhat in a direction normal to the direction of motion of the belt without this being caused by an adjustment of the pulley 122, an arrangement of the pulley 120 on the driving run would make possible small uncontrolled changes in the length of the driving run so that the driving pulley 114 and of the driven pulley 112 would not run absolutely evenly.

On the other hand the pulley 122 may be adjusted in its position normally with respect to the direction of travel of the belt 110 exactly. In the example shown the pulley 122 is for this purpose mounted on a piston rod 126, that is joined to a piston 130 sliding in a cylinder 128, both sides of such piston 130 being acted on hydraulically, viz. it is a question of a double acting hydraulic cylinder make up of the cylinder 128 with the piston 130 making it possible to adjust precisely the position of the pulley 122. Such hydraulic operation represents a simple way of regulating the phase relation of the belt drive in a way dependent on externally ascertained parameters, as for example the operational data of the vehicle and its IC engine.

If the pulley 122 is moved in the opposite direction, the driving run 118 of the belt will gradually decrease in length to be in its position in which it is stretched out straight. The arrangement is in both working examples such that in the one end position of the adjustable pulley 122 the one run 116 or 118 is stretched out and the respective other run 118 or 116 is then deflected or bent as far as possible out of the straight condition. While keeping to this condition changes are still possible in the placing of the pulleys 120 and 122. It would be possible for example in FIG. 7 for the pulley 120 to be on the other belt side, in which case however it would have to run on the other belt side and it would have to move the run 116 to the right out of the stretched out condition, not to the left. In the arrangement of FIG. 7 the spring 124 would have to balance the setting motion of the pulley 122. In the working example of FIG. 8 this is not necessary so that it would be possible to have a smaller and stiffer spring.

Figure 8:
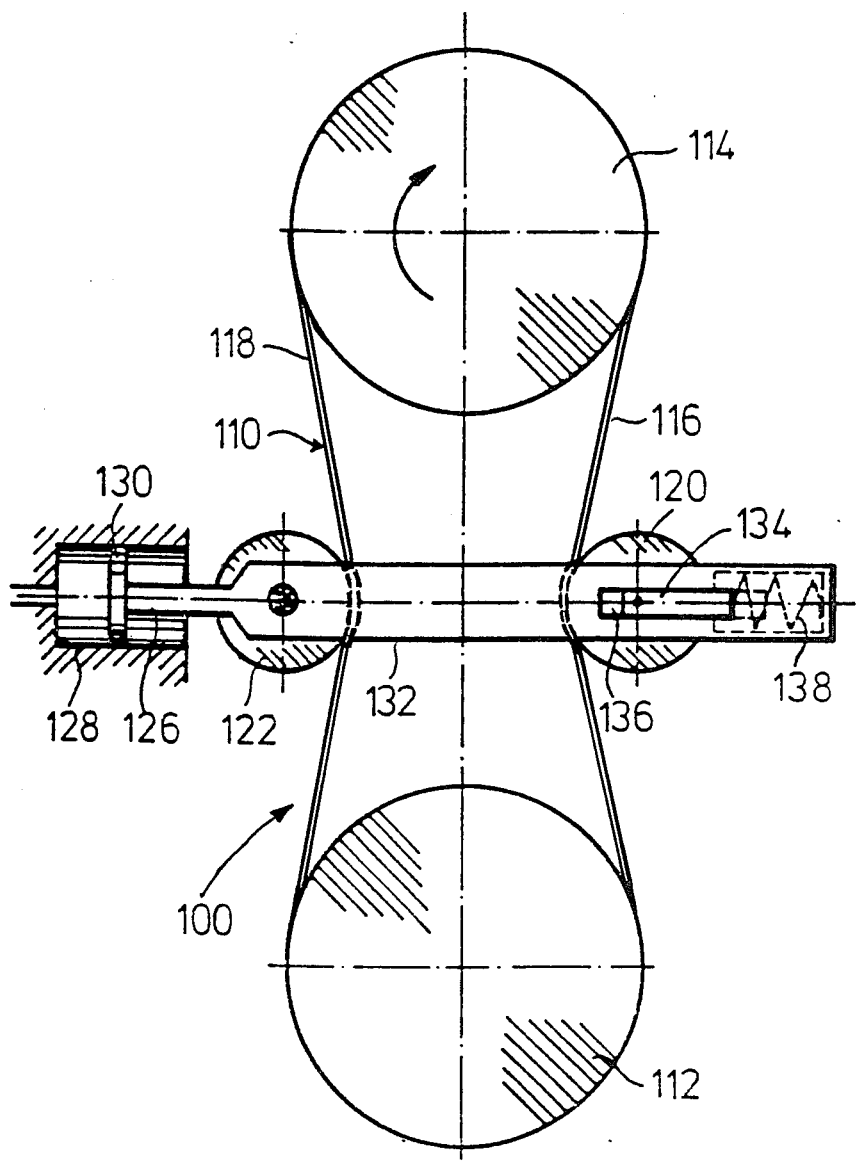
FIG. 8 illustrates diagrammatically a second form of such a belt drive as seen from the side.

In the working example to be seen in FIG. 8 the piston rod 126 is joined to a bearing element 132, in which the pulley 122 is fixedly bearinged. The pulley 120 is bearinged in a slide 134, that may be moved in the bearing element 132 transversely in relation to the direction of motion of the belt 110 for a limited distance, it being possible to have guide slots 136 to receive the slide 134 for this purpose. The slide 134 is supported on a bearing element 132 by way of a spring 138. This spring generally has the purpose of keeping the belt 110 at the desired tension.

Preferably the charger 26 or 64 is provided with a means for damping motion of the partition 20 or 41 as for example some form of hydraulic contrivance or adaptation.

What is claimed is:

1. An internal combustion engine having at least one piston cylinder having an inlet and outlet valve and a piston operatively positioned in the cylinder for introducing charged air into said cylinder, comprising:
   a displacement charger means for charging an amount of air, said displacement charger means having a piston and being in communication with the exhaust gas of the piston cylinder of the engine such that the displacement charger piston is being driven by the exhaust gas from said piston cylinder,
   a heat exchanger operatively associated with said displacement charger means for cooling said charged air prior to entering said piston cylinder, said heat exchanger operatively associated with the air inlet of the engine cylinder,
   means for synchronizing the motion of said engine piston and said charger piston such that the inlet valve of said piston cylinder closes terminating the amount of charging air entering into said piston cylinder before said cylinder piston has reached lower dead center.

2. A method of introducing charged air into a piston cylinder of an internal combustion engine, said piston cylinder having inlet and outlet valves and a piston operatively positioned in said cylinder, comprising:
   charging an amount of air in a displacement charger means,
   transferring said charging air through a heat exhanging means,
   cooling and partially expanding said compressed air to a desired charging pressure,
   transferring said air into said cylinder of said internal combustion engine,
   synchronizing said charging means with said cylinder piston,
   driving said charging means with exhaust gas from said cylinder, said displacement charging means including a piston driven by exhaust gas from said engine cylinder,
   expanding said compressed air in the engine cylinder, and
   varying the phase relation between said cylinder piston and charger piston for adjusting the rate of charging air entering the piston cylinder.

3. The method according to claim 2 further comprising adjusting the air rate entering said displacement charging means.

4. The method according to claim 2 wherein said expansion of charging air in the engine cylinder occurs at about the end of the stroke of the charger piston, a portion of the charging air is drawn into the engine cylinder by the motion of the engine cylinder piston, and a portion flows directly through the charger means.

* * * * *

UNITED STATES PATENT AND TRADEMARK OFFICE
CERTIFICATE OF CORRECTION

PATENT NO. : 4,759,188

DATED : July 26, 1988

INVENTOR(S) : Oskar Schatz

It is certified that error appears in the above-identified patent and that said Letters Patent is hereby corrected as shown below:

Col. 1, Line 48, "make" should be —may—;

Col. 1, Line 66, "modifiying" should be —modifying—;

Col. 3, line 42, "the" (first occurrence in patent) should be —then—;

Col. 4, line 4, "synchronizsation" should be —synchronization—;

Col. 4, line 5, "form" should be —from—;

Col. 5, line 26, "a" should be —at—;

Col. 5, line 38, "1 dc" should be —1dc—;

Col. 6, line 44, "of" should be —on—;

Col. 6, line 52, "its" should be —it—;

Col. 7, line 3, delete "and" (second occurrence);

UNITED STATES PATENT AND TRADEMARK OFFICE
CERTIFICATE OF CORRECTION

PATENT NO. : 4,759,188

DATED : July 26, 1988

INVENTOR(S) : Oskar Schatz

It is certified that error appears in the above-identified patent and that said Letters Patent is hereby corrected as shown below:

Col. 7, line 55, "dirve" should be —drive—;

Col. 8, line 37, "make" should be —made—;

Col. 10, Line 7-8, "exhanging" should be —exchanging—.

Signed and Sealed this

Twenty-seventh Day of June, 1989

Attest:

DONALD J. QUIGG

Attesting Officer

Commissioner of Patents and Trademarks